United States Patent
Bouguettaya

(10) Patent No.: US 8,778,456 B2
(45) Date of Patent: Jul. 15, 2014

(54) COATING COMPOSITION INCLUDING HIGH MOLECULAR WEIGHT POLYCARBODIIMIDE, METHOD OF PREPARING SAME, AND METHOD OF PREPARING COATING ON A SUBSTRATE

(71) Applicant: BASF SE, Ludwigshafen (DE)

(72) Inventor: Mohamed Bouguettaya, Farmington, MI (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/778,775

(22) Filed: Feb. 27, 2013

(65) Prior Publication Data

US 2013/0171361 A1 Jul. 4, 2013

Related U.S. Application Data

(63) Continuation-in-part of application No. PCT/US2012/052828, filed on Aug. 29, 2012.

(60) Provisional application No. 61/528,969, filed on Aug. 30, 2011.

(51) Int. Cl.
*B05D 3/02* (2006.01)
*B05D 1/02* (2006.01)

(52) U.S. Cl.
CPC ... *B05D 3/02* (2013.01); *B05D 1/02* (2013.01)
USPC ..................... 427/385.5; 427/427.4

(58) Field of Classification Search
None
See application file for complete search history.

(56) References Cited

U.S. PATENT DOCUMENTS

| | | | |
|---|---|---|---|
| 2,941,966 A | 6/1960 | Campbell | |
| 3,056,835 A | 10/1962 | Monagle et al. | |
| 3,152,131 A | 10/1964 | Heberling, Jr. | |
| 3,406,197 A | 10/1968 | Ulrich | |
| 3,406,198 A | 10/1968 | Budnick | |
| 3,522,303 A | 7/1970 | Ulrich | |
| 4,143,063 A | 3/1979 | Alberino et al. | |
| 5,650,476 A * | 7/1997 | Amano et al. | 528/44 |
| 5,750,636 A | 5/1998 | Komoto et al. | |
| 5,837,801 A * | 11/1998 | Yahata et al. | 528/310 |
| 6,001,951 A * | 12/1999 | Fukuoka et al. | 528/176 |
| 6,008,311 A * | 12/1999 | Sakamoto et al. | 528/74 |
| 6,017,742 A * | 1/2000 | Takenishi et al. | 435/180 |
| 6,090,906 A * | 7/2000 | Amano et al. | 528/170 |
| 6,313,258 B1 * | 11/2001 | Sakamoto et al. | 528/170 |
| 6,414,105 B2 * | 7/2002 | Misumi et al. | 528/170 |
| 6,420,035 B1 * | 7/2002 | Amano et al. | 428/425.8 |
| 2002/0055606 A1 * | 5/2002 | Misumi et al. | 528/170 |
| 2004/0158021 A1 * | 8/2004 | Sadayori et al. | 528/44 |
| 2005/0261448 A1 * | 11/2005 | Takahashi et al. | 525/907 |

FOREIGN PATENT DOCUMENTS

| | | |
|---|---|---|
| CA | 2760721 A1 | 11/2010 |
| EP | 0398069 A2 | 11/1990 |
| EP | 0557906 A1 | 9/1993 |
| EP | 0928825 A2 | 7/1999 |

OTHER PUBLICATIONS

PCT International Search Report, PCT/US2012/052828, dated Nov. 9, 2012, 4 pages.

\* cited by examiner

*Primary Examiner* — Erma Cameron
(74) *Attorney, Agent, or Firm* — Howard & Howard Attorneys PLLC

(57) ABSTRACT

A coating composition comprises a high molecular weight polycarbodiimide. The high molecular weight polycarbodiimide is produced via a method. A method of preparing the coating composition and a method of forming a coating on a substrate with the coating composition are also disclosed.

6 Claims, No Drawings

COATING COMPOSITION INCLUDING HIGH MOLECULAR WEIGHT POLYCARBODIIMIDE, METHOD OF PREPARING SAME, AND METHOD OF PREPARING COATING ON A SUBSTRATE

CROSS REFERENCE TO RELATED APPLICATION

This application is a continuation-in-part of International (PCT) Application Ser. No. PCT/US12/52828, filed on Aug. 29, 2012, which claims priority to U.S. Provisional Application Ser. No. 61/528,969, filed on Aug. 30, 2011.

BACKGROUND OF THE INVENTION

1. Field of the Invention

The subject invention generally relates to a coating composition and, more particularly, to a coating composition including a high molecular weight polycarbodiimide which forms a coating having excellent physical properties.

2. Description of the Related Art

Polycarbodiimides and compositions including polycarbodiimides are generally known in the art. Polycarbodiimides include repeating structuring units represented by R—N=C=N—R, where R is an independently selected organic group, such as an aromatic group.

Methods of producing polycarbodiimides are also known in the art. In conventional methods of producing polycarbodiimides, an organic isocyanate, such as an aromatic isocyanate, is polymerized in the presence of a carbodiimidization catalyst. Generally, the organic isocyanate is polymerized in the presence of the carbodiimidization catalyst while disposed in a solvent such that the polycarbodiimide is produced in solution.

However, in conventional methods of producing polycarbodiimides in solution, the polycarbodiimides precipitate and/or gel in the solvent once the polycarbodiimides reach a certain molecular weight, which is typically from 1,000 to 3,000. Once the polycarbodiimides precipitate and/or gel in the solvent, polymerization generally ceases such that the molecular weight of the polycarbodiimide does not increase. As such, polycarbodiimides produced via conventional methods have relatively low molecular weight, which significantly decreases potential applications in which the polycarbodiimides may be utilized in view of the physical properties obtainable from such polycarbodiimides. Specifically, the molecular weight of the polycarbodiimides impacts the physical properties of the polycarbodiimides.

In addition, because polycarbodiimides precipitate in conventional methods of producing polycarbodiimides, these polycarbodiimides cannot be stored, transported or processed in solution. Rather, the polycarbodiimides produced via conventional methods are processed in powder form. The powder form of the polycarbodiimides is generally obtained from isolating the polycarbodiimides that have precipitated and/or gelled in the solution. Such polycarbodiimides often have thermosetting properties when heated to a certain temperature (e.g. greater than 180° C.), which further limits applications in which the polycarbodiimides may be utilized.

More specifically, because conventional polycarbodiimides generally have a limited molecular weight, conventional coatings formed from conventional polycarbodiimides also suffer from disadvantages relative to their physical properties. Accordingly, alternatives to such conventional polycarbodiimides are generally utilized in coating compositions, such as epoxy resins and/or polyamides. These alternatives have traditionally provided conventional coatings having improved physical properties as compared to conventional polycarbodiimide coatings. However, such alternatives are expensive.

SUMMARY OF THE INVENTION AND ADVANTAGES

The subject invention provides a coating composition comprising a high molecular weight polycarbodiimide. The high molecular weight polycarbodiimide of the coating composition is formed from a method comprising the steps of providing an isocyanate component comprising toluene diisocyanate (TDI), a carbodiimidization catalyst, and a first solvent having a boiling point temperature of from about 50 to about 150° C. The method of forming the high molecular weight polycarbodiimide further comprises the step of polymerizing the isocyanate component for a first period of time in the first solvent and in the presence of the carbodiimidization catalyst to produce a reaction mixture including at least one carbodiimide compound and the first solvent. In addition, the method of forming the high molecular weight polycarbodiimide comprises the step of combining a second solvent, which is the same as or different from the first solvent, and the reaction mixture. Finally, the method of forming the high molecular weight polycarbodiimide comprises the step of polymerizing the at least one carbodiimide compound for a second period of time in the first and second solvents and in the presence of the carbodiimidization catalyst to produce the high molecular weight polycarbodiimide.

The subject invention also provides a method of preparing the coating composition. The method of preparing the coating composition comprising the steps of providing the isocyanate component, the carbodiimidization catalyst, and the first solvent. The method of preparing the coating composition further comprises the step of polymerizing the isocyanate component for a first period of time in the first solvent and in the presence of the carbodiimidization catalyst to produce the reaction mixture including at least one carbodiimide compound and the first solvent. In addition, the method of preparing the coating composition comprises the step of combining the second solvent, which is the same as or different from the first solvent, and the reaction mixture. Finally, the method of preparing the coating composition comprises the step of polymerizing the at least one carbodiimide compound for a second period of time in the first and second solvents and in the presence of the carbodiimidization catalyst to prepare the coating composition including a high molecular weight polycarbodiimide.

The subject invention further provides a method of forming a coating on a substrate. The method of forming the coating comprises the steps of providing the isocyanate component, the carbodiimidization catalyst, and the first solvent. The method of forming the coating further comprises the step of polymerizing the isocyanate component for a first period of time in the first solvent and in the presence of the carbodiimidization catalyst to produce the reaction mixture including at least one carbodiimide compound and the first solvent. In addition, the method of forming the coating comprises the step of combining the second solvent, which is the same as or different from the first solvent, and the reaction mixture. The method of forming the coating also comprises the step of polymerizing the at least one carbodiimide compound for a second period of time in the first and second solvents and in the presence of the carbodiimidization catalyst to produce a high molecular weight polycarbodiimide. Finally, the method of forming the coating comprises the step of applying a coating composition comprising the high molecular weight polycarbodiimide on the substrate to form the coating.

The coating composition of the instant invention forms coatings having excellent physical properties, including corrosion resistance, chemical resistance, resistance to abrasion, adhesion, and UV stability. These physical properties were not previously obtainable in conventional coatings including conventional polycarbodiimides due to the limited molecular weights of such conventional polycarbodiimides. In fact, the coating composition of the instant invention forms coatings having superior physical properties as compared to conventional coatings, such as epoxy resin and/or polyamide coatings. Moreover, not only does the coating composition of the instant invention form coatings having superior physical properties as compared to conventional coatings, but the instant coating composition may be prepared at a significantly reduced cost as compared to these conventional coatings.

DETAILED DESCRIPTION OF THE INVENTION

The present invention provides a coating composition, a method of preparing the coating composition, and a method of forming a coating on a substrate, which are each described in detail below. The coating composition comprises a high molecular weight polycarbodiimide and the coating formed therefrom has excellent physical properties.

The high molecular weight polycarbodiimide of the coating composition is produced from a method.

The method of producing the high molecular weight polycarbodiimide comprises the step of providing an isocyanate component. The isocyanate component comprises toluene diisocyanate (TDI). The isocyanate component may comprise either isomer of toluene diisocyanate (TDI), i.e., the isocyanate component may comprise 2,4-toluene diisocyanate (2,4-TDI) or 2,6-toluene diisocyanate (2,6-TDI). Alternatively, the isocyanate component may comprise a blend of these isomers, i.e., the isocyanate component may comprise both 2,4-toluene diisocyanate (2,4-TDI) and 2,6-toluene diisocyanate (2,6-TDI). One specific example of a commercially available isocyanate component suitable for the purposes of the present invention is Lupranate® T-80, which is commercially available from BASF Corporation of Florham Park, N.J. Notably, Lupranate® T-80 comprises a blend of 2,4-toluene diisocyanate (2,4-TDI) and 2,6-toluene diisocyanate (2,6-TDI). In certain embodiments, the isocyanate component consists essentially of, or consists of, TDI. Generally, the isocyanate component comprises TDI in an amount of from greater than 95, alternatively greater than 96, alternatively greater than 97, alternatively greater than 98, alternatively greater than 99, percent by weight based on the total weight of isocyanate present in the isocyanate component.

The method of producing the high molecular weight polycarbodiimide further comprises the step of providing a carbodiimidization catalyst. The carbodiimidization catalyst may be any type of carbodiimidization catalyst known to those skilled in the art for producing a polycarbodiimide. Generally, the carbodiimidization catalyst is selected from the group of tertiary amides, basic metal compounds, carboxylic acid metal salts and/or non-basic organo-metallic compounds. In certain embodiments, the carbodiimidization catalyst comprises a phosphorus compound.

Specific examples of phosphorus compounds suitable for the purposes of the carbodiimidization catalyst include, but are not limited to, phospholene oxides such as 3-methyl-1-phenyl-2-phospholene oxide, 1-phenyl-2-phospholen-1-oxide, 3-methyl-1-2-phospholen-1-oxide, 1-ethyl-2-phospholen-1-oxide, 3-methyl-1-phenyl-2-phospholen-1-oxide, and 3-phospholene isomers thereof. A particularly suitable phospholene oxide is 3-methyl-1-phenyl-2-phospholene oxide. For illustrative purposes only, 3-methyl-1-phenyl-2-phospholene oxide is represented by the following structure:

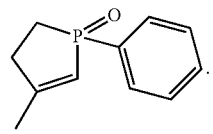

Additional examples of phosphorous compounds suitable for the purposes of the carbodiimidization catalyst include, but are not limited to, phosphates, diaza- and oxaza phospholenes and phosphorinanes. Specific examples of such phosphorous compounds include, but are not limited to, phosphate esters and other phosphates such as trimethyl phosphate, triethyl phosphate, tributyl phosphate, tri-2-ethylhexyl phosphate, tributoxyethyl phosphate, trioleyl phosphate, triphenyl phosphate, tricresyl phosphate, trixylenyl phosphate, cresyl diphenyl phosphate, xylenyl diphenyl phosphate, 2-ethylhexyldiphenyl phosphate, and the like; acidic phosphates such as methyl acid phosphate, ethyl acid phosphate, isopropyl acid phosphate, butyl acid phosphate, 2-ethylhexyl acid phosphate, isodecyl acid phosphate, lauryl acid phosphate, isotridecyl acid phosphate, myristyl acid phosphate, isostearyl acid phosphate, oleyl acid phosphate, and the like; tertiary phosphites such as triphenyl phosphite, tri(p-cresyl) phosphite, tris(nonylphenyl) phosphite, triisooctyl phosphite, diphenylsodecyl phosphite, phenyldiisodecyl phosphite, triisodecyl phosphite, tristearyl phosphite, trioleyl phosphite, and the like; secondary phosphites such as di-2-ethylhexyl hydrogen phosphite, dilauryl hydrogen phosphite, dioleyl hydrogen phosphite, and the like; and phosphine oxides, such as triethylphosphine oxide, tributylphosphine oxide, triphenylphosphine oxide, tris(chloromethyl)phosphine oxide, tris(chloromethyl)phosphine oxide, and the like. Carbodiimidization catalysts comprising phosphate esters and methods for their preparation are described in U.S. Pat. No. 3,056,835, which is hereby incorporated by reference in its entirety.

Yet further examples the carbodiimidization catalyst include, but are not limited to, 1-phenyl-3-methyl phospholene oxide, 1-benzyl-3-methyl phospholene oxide, 1-ethyl-3-methyl phospholene oxide, 1-phenyl-3-methyl phospholene dichloride, 1-benzyl-3-methyl phospholene dichloride, 1-ethyl-3-methyl phospholene dichloride, 1-phenyl-3-methyl phospholene sulphide, 1-phenyl-3-methyl phospholene sulphide, 1-benzyl-3-methyl phospholene sulphide, 1-ethyl-3-methyl phospholene sulphide, 1-phenyl-1-phenylimino-3-methyl phospholene oxide, 1-benzyl-1-phenylimino-3-methyl phospholene oxide 1-ethyl-1-phenylimino-3-methyl phospholene oxide, 1-phenyl phospholidine, 1-benzyl phospholidine, 1-ethyl phospholidine, and 1-phenyl-3-methyl phospholene oxide.

The carbodiimidization catalyst may alternatively comprise diaza and oxaza phospholenes and phosphorinanes. Diaza and oxaza phospholenes and phosphorinanes and methods for their preparation are described in U.S. Pat. No. 3,522,303, which is hereby incorporated by reference in its entirety. Specific diaza- and oxaza phospholenes and phosphorinanes include, but are not limited to, 2-ethyl-1,3-dimethyl-1,3,2-diazaphospholane-2-oxide; 2-chloromethyl-1,3-dimethyl-1,3,2-diazaphospholane-2-oxide; 2-trichloromethyl-1,3-dimethyl-1,3,2-diazaphospholane-2- oxide; 2-phenyl-1,3-dimethyl-1,3,2-diazaphospholane-2-oxide; 2-phenyl-1,3-dimethyl-1,3,2-di aza-phosphorinane-2-oxide; 2-benzyl-1,3-dimethyl-1,3,2-diazaphospholane-2-oxide; 2-allyl-1,3-dimethyl-1,3,2-diazaphospholane-2-oxide; 2-bromomethyl-1,3-dimethyl-1,3,2-diazaphospholane-2-oxide; 2-cyclohexyl-1,3-dimethyl-1,3,2-diazaphospholane-2-oxide; 2-cyclohexyl-1,3-dimethyl-1,3,2-diaphospholane-2-oxide; 2-(2-ethoxyethyl-1,3-dimethyl-1,3,2-diazaphospholane-2-oxide; and 2-naphthyl-1,3-dimethyl-1,3,2-diazaphospholane-2-oxide, triethyl phosphate, hexamethyl phosphoramide, and the like.

The carbodiimidization catalyst may comprise a triaryl arsine. Triaryl arsines and methods for their preparation are described in U.S. Pat. No. 3,406,198, which is hereby incorporated by reference in its entirety. Specific examples of triaryl arsines include, but are not limited to, triphenylarsine, tris(p-tolyl)arsine, tris(p-methoxyphenyl)arsine, tris(p-ethoxyphenyl)arsine, tris(p-chlorophenyl)arsine, tris(p-fluorophenyl)arsine, tris(2,5-xylyl)arsine, tris(p-cyanophenyl)arsine, tris(1-naphthyl)arsine, tris(p-methylmercaptophenyl) arsine, tris(p-biphenylyl)arsine, p-chlorophenyl bis(ptolyl) arsine, phenyl(p-chlorophenyl)(p-bromophenyl)arsine, and the like. Additional arsine compounds are described in U.S. Pat. No. 4,143,063, which is hereby incorporated by reference in its entirety. Specific examples of such arsine compounds include, but are not limited to, triphenylarsine oxide, triethylarsine oxide, polymer bound arsine oxide, and the like.

Further, the carbodiimidization catalyst may comprise metallic derivatives of acetylyacetone. Metallic derivatives of acetylyacetone and methods are described in U.S. Pat. No. 3,152,131, which is hereby incorporated by reference in its entirety. Specific examples of metallic derivatives of acetylyacetone include, but are not limited to, metallic derivatives of acetylacetone such as the beryllium, aluminum, zirconium, chromium, and iron derivatives.

Additional examples of the carbodiimidization catalyst include metal complexes derived from a d-group transition element and π-bonding ligand selected from the group consisting of carbon monoxide, nitric oxide, hydrocarbylisocyanides, trihydrocarbylphosphine, trihydfrocarbylarsine, trihydrocarbylstilbine, and dihydrocarbylsulfide wherein hydrocarbyl in each instance contains from 1 to 12 carbon atoms, inclusive, provided that at least one of the π-bonding ligands in the complex is carbon monoxide or hydrocarbylisocyanide. Such metal complexes and methods for preparation are described in U.S. Pat. No. 3,406,197, which is hereby incorporated by reference in its entirety. Specific examples of metal complexes include, but are not limited to, iron pentacarbonyl, di-iron pentacarbonyl, tungsten hexacarbonyl, molybdenum hexacarbonyl, chromium hexacarbonyl, dimanganese decacarbonyl, nickel tetracarbonyl, ruthenium pentacarbonyl, the complex of iron tetracarbonyl:methylisocyanide, and the like.

The carbodiimidization catalyst may comprise organotin compounds. Specific examples of organotin compounds include, but are not limited to, dibutylin dilaurate, dibutyltin diacetate, dibutyltin di(2-ethylhexanoate), dioctyltin dilaurate, dibutylin maleate, di(n-octyl)tin maleate, bis(dibutylacetoxytin) oxide, bis(dibutyllauroyloxytin) oxide, dibutyltin dibutoxide, dibutyltin dimethoxide, dibutyltin disalicilate, dibutyltin bis(isooctylmaleate), dibutyltin bis(isopropylmaleate), dibutyltin oxide, tributyltin acetate, tributyltin isopropyl succinate, tributyltin linoleate, tributyltin nicotinate, dimethyltin dilaurate, dimethyltin oxide, diotyltin oxide, bis(tributyltin) oxide, diphenyltin oxide, triphenyltin acetate, tri-n-propyltin acetate, tri-n-propyltin laurate and bis(tri-n-propyltin) oxide, dibutyltin dilauryl mercaptide, dibutyltin bis(isooctylmercaptoacetate), bis(triphenyltin)oxide, stannous oxalate, stannous oleate, stannous naphthenate, stannous acetate, stannous butyrate, stannous 2-ethylhexanoate, stannous laurate, stannous palmitate, stannous stearate, and the like. Typical organotin compounds include, but are not limited to, stannous oxalate, stannous oleate and stannous 2-ethylhexanoate, dibutyltin diacetate, dibutyltin dilaurate, dibutyltin dilaurylmercaptide, dibutyltin bis(isooctylmercaptoacetate), dibutyltin oxide, bis(triphenyltin) oxide, and bis(tri-n-butyltin) oxide.

Further, the carbodiimidization catalyst may comprise various organic and metal carbene complexes, titanium(IV) complexes, copper(I) and/or copper(II) complexes.

The method of producing the high molecular weight polycarbodiimide also comprises the step of providing a first solvent having a boiling point temperature of from about 50 to about 150° C. The first solvent typically has a boiling point temperature of from about 75 to about 125, more typically from about 90 to about 120, ° C. In certain embodiments, the first solvent comprises an aromatic solvent. One example of an aromatic solvent particularly suitable for the method is toluene, which has a boiling point temperature of about 110° C. at atmospheric pressure. Another example of an aromatic solvent is xylene, whose boiling point ranges from 138 to 144° C. for different isomers. As readily understood in the art, other solvents having a boiling point temperature of from about 50 to about 150° C. may be utilized as the first solvent, including aromatic solvents other than toluene and xylene.

The method of producing the high molecular weight polycarbodiimide additionally comprises the step of polymerizing the isocyanate component for a first period of time in the first solvent and in the presence of the carbodiimidization catalyst to produce a reaction mixture including at least one carbodiimide compound and the first solvent. Typically, the reaction mixture also comprises the carbodiimidization catalyst.

The first period of time during which the isocyanate component is polymerized is generally sufficient for the reaction mixture to precipitate, gel, and/or become turbid. For example, a combination of the isocyanate component, the carbodiimidization catalyst and the first solvent is typically a transparent (i.e., optically clear) liquid having a yellow hue. However, the first period of time is sufficient for the reaction mixture to precipitate, gel, and/or become turbid. Generally, turbidity of the reaction mixture increases with time, i.e., turbidity and time are directly proportional. Said differently, the reaction mixture typically becomes more turbid as time progresses during the step of polymerizing the isocyanate component. The reaction mixture may have various degrees of turbidity without departing from the scope of the present invention. Similarly, the first period of time is not limited to the period of time necessary for the reaction mixture to become slightly turbid. Rather, the first period of time may extend beyond the period of time necessary for the reaction mixture to become slightly turbid. Said differently, the first period of time may be selected such that the step of polymerizing the isocyanate component is carried out even after the reaction mixture precipitates, gels, and/or becomes turbid without departing from the scope of the present invention.

Typically, the first period of time during which the isocyanate component is polymerized is from about 120 to about 420, typically from about 180 to about 360, more typically from about 200 to about 340, most typically from about 240 to about 300 minutes. As introduced above, the reaction mixture may begin to become turbid after, for example, 60 minutes, yet the first period of time typically extends beyond the time at which the reaction mixture begins to become turbid.

The step of polymerizing the isocyanate component is typically carried out above room temperature. In particular, the step of polymerizing the isocyanate component is typically carried at a temperature greater than about 80, typically greater than about 90, more typically greater than about 95, most typically from about 100 to about 110° C. When the first solvent comprises toluene, the step of polymerizing the isocyanate component is typically carried at the boiling point temperature of the first solvent.

As introduced above, the step of polymerizing the isocyanate component in the first solvent and in the presence of the carbodiimidization catalyst produces a reaction mixture including at least one carbodiimide compound. For purposes of clarity, the at least one carbodiimide compound is referred to herein as "the carbodiimide compound," which is to be understood to encompass a variety of carbodiimide compounds which may be simultaneously or alternatively produced via the step of polymerizing the isocyanate component in the first solvent and in the presence of the carbodiimidization catalyst. The carbodiimide compound may be monomeric, oligomeric, or polymeric. Further, the step of polymerizing the isocyanate component in the first solvent and in the presence of the carbodiimidization catalyst may produce a reaction mixture including combinations of carbodiimide compounds which may independently be monomeric, oligomeric, or polymeric.

The carbodiimide compound formed from the step of polymerizing the isocyanate component typically has a number average molecular weight of from about 1,000 to about 10,000, more typically from about 2,000 to about 8,000, most typically from about 3,000 to about 8,000, Daltons. In addition, the carbodiimide compound typically forms a white solid in the reaction mixture when the carbodiimide compound has the molecular weight set forth above.

The step of polymerizing the isocyanate component is typically carried out in an inert atmosphere, i.e., an atmosphere substantially free from oxygen. Any inert atmosphere known in the art may be utilized during the step of polymerizing the isocyanate component. Typically, the inert atmosphere comprises an inert gas, such as nitrogen, argon, helium, and carbon dioxide, etc.

As readily understood in the art, carbon dioxide gas is released during the step of polymerizing the isocyanate component. Specifically, carbon dioxide is a by-product formed when —N=C=O groups present in the isocyanate component react with one another to form —N=C=N— linkages.

A reaction mechanism illustrative of the polymerization of the isocyanate component is set forth below. In the reaction mechanism below, the isocyanate component comprises 2,4-toluene diisocyanate (2,4-TDI) and 2,6-toluene diisocyanate (2,6-TDI), which are reacted in the presence of a carbodiimidization catalyst to produce various polycarbodiimides. In the polycarbodiimides of the reaction mechanism below, n is an integer dependent upon the molecular weight of the particular polycarbodiimide

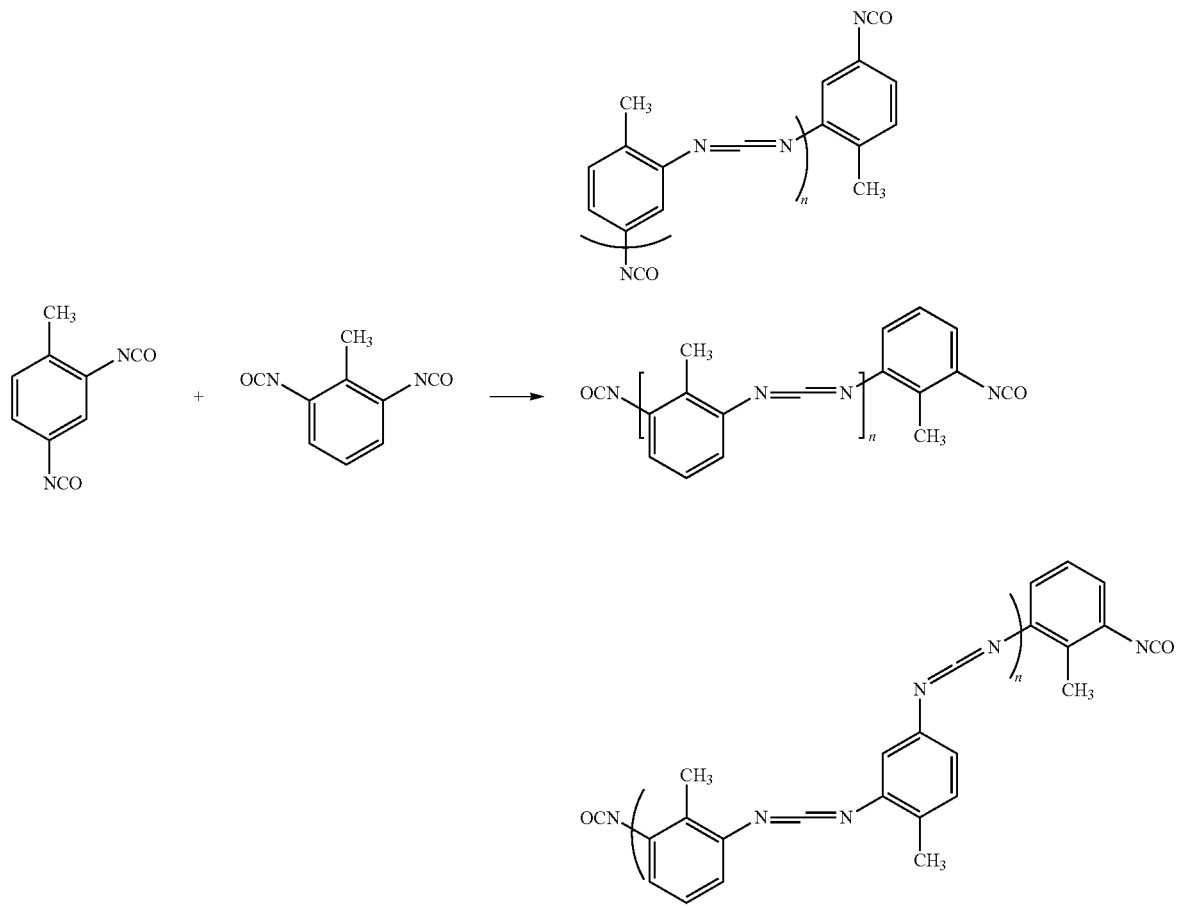

The method of producing the high molecular weight polycarbodiimide further comprises the step of combining a second solvent, which is the same as or different from the first solvent, and the reaction mixture. In certain embodiments, the method further comprises the step of combining an additional amount of the carbodiimidization catalyst, the second solvent, and the reaction mixture. In these embodiments, the second solvent and the carbodiimidization catalyst may be introduced into the reaction mixture separately, i.e., discretely, or simultaneously. When introduced separately, either the second solvent or the additional amount of the carbodiimidization catalyst may be first introduced into the reaction mixture. Alternatively, the reaction mixture may be introduced into the second solvent and the additional amount of the carbodiimidization catalyst, or the reaction mixture may be introduced into the second solvent individually or the additional amount of the carbodiimidization catalyst individually.

In certain embodiments, the first and second solvents are the same. For example, the first and second solvents may comprise toluene. In other embodiments, the second solvent is different from the first solvent. Typically, the second solvent is different from the first solvent.

In embodiments in which the second solvent is different from the first solvent, the second solvent typically has a boiling point temperature less than the boiling point temperature of the first solvent. For example, when the first solvent comprises toluene, and when the second solvent is different than the first solvent, the second solvent typically has a boiling point temperature less than 90° C., i.e., less than the boiling point temperature of toluene.

In certain embodiments when the second solvent is different from the first solvent, the second solvent comprises a cyclic ether. For example, the second solvent may comprise tetrahydrofuran (THF). As understood in the art, tetrahydrofuran (THF) is a cyclic ether having a boiling point temperature of about 66° C. For illustrative purposes only, the structure of tetrahydrofuran (THF) is set forth immediately below:

In other embodiments in which the second solvent is different from the first solvent, the second solvent comprises a polar solvent other than tetrahydrofuran (THF). For example, one example of a polar solvent suitable for the purposes of the second solvent of the method is dimethyl sulfoxide (DMSO).

The second solvent is typically employed in an amount that is less than an amount of the first solvent utilized during the step of polymerizing the isocyanate component. In particular, the second solvent is typically utilized in an amount of from about 15 to about 75, more typically from about 25 to about 70, most typically from about 40 to about 60 percent by weight relative to the total amount of the first solvent present in the reaction mixture.

As introduced above, the carbodiimide compound formed during the step of polymerizing the isocyanate compound in the first solvent and in the presence of the carbodiimidization catalyst for the first period of time is typically a solid. Said differently, the carbodiimide compound typically precipitates and/or gels in the reaction mixture such that the carbodiimide compound is not solubilized by the first solvent. Generally, once the carbodiimide compound precipitates and/or gels in the reaction mixture, polymerization of the isocyanate component ceases such that the molecular weight of the carbodiimide compound no longer increases. However, in certain embodiments, the second solvent is capable of solubilizing the carbodiimide compound. As such, in these embodiments, during the step of combining the second solvent and the reaction mixture, the carbodiimide compound which is present in the reaction mixture is solubilized by the second solvent such that a combination of the second solvent and the reaction mixture is a liquid.

When the method comprises the step of combining the additional amount of the carbodiimidization catalyst, the reaction mixture, and the second solvent, the additional amount of the carbodiimidization catalyst utilized is typically less than an amount of the carbodiimidization catalyst utilized during the step of polymerizing the isocyanate component in the first solvent. Alternatively, the additional amount of the carbodiimidization catalyst utilized may be more than the amount of the carbodiimidization catalyst utilized during the step of polymerizing the isocyanate component in the first solvent. It is to be appreciated that the additional amount of the carbodiimidization catalyst may vary dependent upon various and relative amounts of other components, such as the isocyanate component, the second solvent, etc. The additional amount of the carbodiimidization catalyst may comprise the same carbodiimidization catalyst as utilized during the step of polymerizing the isocyanate component or may be independently selected from the carbodiimidization catalysts set forth above.

In certain embodiments, the reaction mixture is cooled to about room temperature prior to combining the second solvent and the reaction mixture. Alternatively, the reaction mixture may be combined with the second solvent at a temperature other than room temperature, e.g. at a temperature between room temperature and about 110° C. Generally, the reaction mixture is cooled to about room temperature prior to combining the second solvent and the reaction mixture. This is particularly typical when the reaction mixture is produced at the boiling point temperature of the first solvent and when the second solvent has a boiling point temperature less than the boiling temperature of the first solvent because it is undesirable to introduce the second solvent to a temperature above its boiling point temperature.

The method of producing the high molecular weight polycarbodiimide also comprises the step of polymerizing the carbodiimide compound for a second period of time in the first and second solvents and in the presence of the carbodiimidization catalyst to produce the high molecular weight polycarbodiimide.

Typically, the second period of time during which the carbodiimide compound is polymerized is greater than about 100 minutes. In particular, the second period of time during which the carbodiimide compound is polymerized is typically from about 100 to about 200, more typically from about 120 to about 180, most typically from about 140 to about 160 minutes. It is to be appreciated that the second period of time may deviate from the ranges set forth above contingent upon the desired molecular weight of the high molecular weight polycarbodiimide without departing from the scope of the present invention. For example, in certain applications in which the molecular weight of the high molecular weight polycarbodiimide is not particularly critical, the second period of time may be less than 100 minutes. Alternatively, the second period of time may exceed 200 minutes.

The step of polymerizing the carbodiimide compound is typically carried out above room temperature. In particular, the step of polymerizing the carbodiimide compound is typically carried at a temperature greater than about 60, typically greater than about 70, more typically greater than about 80, most typically from about 85 to about 95, °C. In certain embodiments, the step of polymerizing the carbodiimide compound is typically carried at the boiling point temperature of a combination of the first and second solvents. It is to be appreciated that the temperature at which the carbodiimide compound is polymerized is contingent on the particular first and second solvents utilized and the relative amounts thereof. As such, the temperature at which the carbodiimide compound is polymerized may deviate from the ranges set forth above without departing form the scope of the present invention.

As described above, the second solvent typically solubilizes the carbodiimide compound such that the carbodiimide compound may continue to polymerize with any other carbodiimide compounds and/or with residual isocyanate component.

The step of polymerizing the carbodiimide compound to produce the high molecular weight polycarbodiimide is typically carried out in an inert atmosphere, i.e., an atmosphere substantially free from oxygen. Any inert atmosphere known in the art may be utilized during the step of polymerizing the carbodiimide compound. The inert atmosphere may be the same as or different from the inert atmosphere utilized during the step of polymerizing the isocyanate component. Typically, the inert atmosphere comprises an inert gas, such as nitrogen, argon, helium, and carbon dioxide, etc.

As described above with respect to the step of polymerizing the isocyanate component, carbon dioxide gas may also be released during the step of polymerizing the carbodiimide compound.

The high molecular weight polycarbodiimide compound of the coating composition typically has a weight average molecular weight that cannot be measured via traditional techniques, such as a refractive index detector. Generally, weight average molecular weight of a polymer cannot be measured via a refractive index detector if a mole fraction of the polymer has a molecular weight exceeding 1,000,000. As such, the number and weight average molecular weight of the high molecular weight polycarbodiimide referenced herein are generally measured via an evaporative light scattering detector (ELSD) unless specifically stated otherwise. The high molecular weight polycarbodiimide produced in accordance with the method described above has a mole fraction greater than 0 having a weight average molecular weight of at least about 100,000, more typically at least about 250,000, most typically at least about 500,000, as measured via the evaporative light scattering detector (ELSD). In certain embodiments, the high molecular weight polycarbodiimide has a mole fraction greater than 0 having a weight average molecular weight of at least about 1,000,000. Conversely, conventional methods of producing polycarbodiimides do not achieve any mole fraction having a weight average molecular weight exceeding 100,000.

More specifically, when the first solvent comprises toluene, the second solvent comprises tetrahydrofuran (THF), and the additional amount of the carbodiimidization catalyst is utilized, the high molecular weight polycarbodiimide typically has a mole fraction percentage greater than 20, more typically greater than 25, most typically greater than 30 having a weight average molecular weight of at least about 100,000. In this embodiment, the high molecular weight polycarbodiimide typically has a mole fraction percentage typically greater than 5, more typically greater than 10, most typically greater than 15 having a weight average molecular weight of at least about 250,000. Further, in this embodiment, the high molecular weight polycarbodiimide typically has a mole fraction percentage typically greater than 5, more typically greater than 7.5, most typically greater than 10 having a weight average molecular weight of at least about 500,000. Additionally, in this embodiment, the high molecular weight polycarbodiimide typically has a mole fraction percentage typically greater than 1, more typically greater than 2, most typically greater than 3 having a weight average molecular weight of at least about 1,000,000.

In an alternative embodiment in which the first and second solvents each comprise toluene, and when the additional amount of the carbodiimidization catalyst is not utilized, the high molecular weight polycarbodiimide typically has a mole fraction percentage greater than 1, more typically greater than 2, most typically greater than 3 having a weight average molecular weight of at least about 100,000. In this embodiment, the high molecular weight polycarbodiimide typically has a mole fraction percentage typically greater than 0.1, more typically greater than 0.2, most typically greater than 0.3 having a weight average molecular weight of at least about 250,000.

The coating composition typically further comprises a solvent for solubilizing the high molecular weight polycarbodiimide produced via the method described above.

The solvent of the coating composition may be the first and/or the second solvents described above. For example, the method of producing the high molecular weight polycarbodiimide above may also be utilized to prepare the coating composition, in which the solvent of the coating composition comprises the first and second solvents. Alternatively, additional and/or different solvents may be utilized in the coating composition. For example, solvent(s) may be added to the first and/or second solvents, or the high molecular weight polycarbodiimide may be isolated from the first and second solvents and subsequently solubilized in the solvent of the coating composition.

Because of the molecular weight of the high molecular weight polycarbodiimide, few solvents are capable of solubilizing the high molecular weight polycarbodiimide. To this end, in various embodiments, the solvent of the coating composition comprises the first and/or second solvents, typically a combination of the first and second solvents. In these embodiments, the first and second solvents may be present in the coating composition in various ranges. For example, in various embodiments, the first solvent is present in the coating composition in an amount of from 70 to 90, alternatively from 75 to 85, alternatively from 78 to 82, parts by weight based on 100 parts by weight of total solvent in the coating composition. In these embodiments, the second solvent is typically present in the coating composition in an amount of from 10 to 30, alternatively from 15 to 25, alternatively from 18 to 22, parts by weight based on 100 parts by weight of total solvent in the coating composition.

The coating composition may further comprise components in addition to the solvent and the high molecular weight polycarbodiimide. For example, to improve upon the shelf life of the coating composition, in various embodiments, the coating composition further comprises a stability additive. One example of a stability additive suitable for the coating composition is phenyl isocyanate. When utilized, the stability additive is typically present in the coating composition in an amount of from greater than 0 to 2, alternatively from 0.25 to 1.5, alternatively from 0.5 to 1.0, percent by weight based on the total weight of the coating composition.

Additional examples of further components that may be present in the coating composition include adhesion promoters, UV stabilizers, colorants, flame retardants, fillers, thixotropic agents, diluents, etc.

However, the excellent physical properties of the coating formed from the coating composition are obtainable in the absence of such further components. For example, the coating formed from the coating composition has excellent adhesion to a variety of substrates in the absence of adhesion promoters, and the coating formed from the coating composition has excellent UV stability in the absence of UV stabilizers. To this end, in various embodiments, the coating composition consists essentially of the high molecular weight polycarbodiimide, the solvent (which is typically a combination of the first and second solvents), and optionally the stability additive. In these embodiments, the coating composition is substantially free from additional components, e.g. adhesion promoters and UV stabilizers, i.e., such additional components are present in the coating composition in an amount of from less than 1, alternatively less than 0.5, alternatively less than 0.25, alternatively less than 0.1, alternatively 0, percent by weight based on the total weight of the coating composition.

The high molecular weight polycarbodiimide may be present in the coating composition in varying amounts. For example, the high molecular weight polycarbodiimide is typically present in the coating composition in an amount of from greater than 0 to less than 35 percent by weight based on the total weight of the coating composition, with the balance being the solvent. The loading of the high molecular weight polycarbodiimide is generally a function of its molecular weight and solubility, as well the selection and amount of the solvent. To this end, when the solvent comprises the first and second solvents, the coating composition may comprise the high molecular weight polycarbodiimide in an amount of up to 20 to 35, alternatively 25 to 30, percent by weight based on the total weight of the coating composition.

As introduced above, the present invention further provides a method of preparing the coating composition. The method comprises the same steps described above with reference to the method of preparing the high molecular weight polycarbodiimide of the coating composition. However, in the method of preparing the coating composition, the step of polymerizing the at least one carbodiimide compound for the second period of time in the first and second solvents and in the presence of the carbodiimidization catalyst prepares the high molecular weight polycarbodiimide and the coating composition.

In certain embodiments, the method of preparing the coating composition further comprises modifying a solvent content of the coating composition. For example, as described above, solvents other than or in addition to the first and/or second solvents may be utilized in the coating composition. To this end, in these embodiments, the method of preparing the coating composition comprises modifying the solvent content of the coating composition in accordance with the desired solvent of the coating composition. Typically, however, the solvent of the coating composition comprises the first and second solvents such that the method of preparing the coating composition may be free from the step of modifying the solvent content of the coating composition. However, even when the solvent of the coating composition comprises the first and/or second solvents, the relative amounts of the first and/or second solvents may be modified in the coating composition. For example, an additional amount of the second solvent may be added to the coating composition.

Additional aspects of the steps of preparing the high molecular weight polycarbodiimide (and the coating composition), and additional aspects of the coating composition itself, are described above with reference to the method of preparing the high molecular weight polycarbodiimide, which are equally applicable to the method of preparing the coating composition The subject invention additionally provides a method of forming a coating on a substrate. The method of forming the coating comprises the same steps above relative to the method of producing the high molecular weight polycarbodiimide. The method of forming the coating further comprises the step of applying the coating composition comprising the high molecular weight polycarbodiimide on the substrate to form the coating.

The step of applying the coating composition on the substrate may be carried out via any known wet coating method. For example, the coating composition may be applied by dip coating, spin coating, flow coating, spray coating, roll coating, gravure coating, slot coating, and combinations thereof. Alternatively, the coating composition may be applied by casting. Most typically, the coating composition is applied to the substrate by spraying (e.g. by a spraying gun) or casting the coating composition on the substrate.

The substrate on which the coating composition is applied may be any substrate. For example, the substrate may be metallic, polymeric, synthetic, natural, etc. Specific examples of metallic substrates include those comprising any metal (e.g. aluminum) or alloy or composite of a metal (e.g. stainless steel). Specific examples of polymeric substrates include polycarbonates, polyamides, polyimides, polysulfones, polyethylene terephthalate and polycarbonate copolymers, polyolefins, polynorbornenes, diethylene glycol-bis(allyl carbonate), (meth)acrylic polymers and copolymers, thio(meth)acrylic polymers and copolymers, urethane and thiourethane polymers and copolymers, epoxy polymers and copolymers, and episulfide polymers and copolymers. One example of a natural substrate is wood, which may be derived from any type of wood (e.g. softwood and/or hardwood).

Generally, when the coating composition is applied on the substrate, a layer is formed from the coating composition, and the coating is formed from the layer by curing the layer. To this end, in certain embodiments, the step of applying the coating composition on the substrate further comprising curing the layer formed from the coating composition to form the coating on the substrate.

The step of curing the layer may be carried out at ambient temperature or at a temperature above ambient temperature. In certain embodiments, the layer is cured at ambient temperature for a first time period, and then the layer is further cured at an elevated temperature for a second time period, to form the coating on the substrate. The first time period may be from greater than 0 seconds to up to, for example, one day. Most typically, the first period of time is from 120 to 240 minutes. The elevated temperature is typically sufficient to evaporate the solvent from the layer. In certain embodiments, the elevated temperature is from 100 to 120, alternatively from 105 to 115, ° C. The second time period may vary and is generally sufficient for curing of the layer, typically from greater than 0 to 45, alternatively from 5 to 30, alternatively from 10 to 20, minutes. If desired, the coating may be subjected to additional heating steps for improving upon physical properties of the coating. For example, the coating may be heated at a second elevated temperature for a third time period, etc. The coating typically has a thickness of from greater than 0 to 5, alternatively from 0.5 to 3, alternatively from 1 to 2, mils. The coating may have a thickness that deviates from the ranges set forth immediately above contingent in the application in which the coating is utilized.

The coating formed via the method and from the coating composition has excellent physical properties, including corrosion resistance, chemical resistance, abrasion and impact resistance, and adhesion. For example, the coating formed in accordance with the method generally has improved corrosion resistance as compared to coatings formed from epoxy and/or polyamide when measured in accordance with ASTM B117. Similarly, the coating formed in accordance with the method generally has improved chemical resistance as compared to coatings formed from epoxy and/or polyamide when measured in accordance with ASTM D4752. In fact, there is generally no observable physical damage to the coating when tested in accordance with ASTM D4752, whereas coatings comprising epoxy and/or polyamide substantially degrade under identical conditions. Further, the coating generally has an excellent abrasion resistance as measured in accordance with ASTM D4060 with a CS-17 abrading wheel and a load of 500 g. For example, the coating generally has a Taber weight loss of less than 20, alternatively less than 10, alternatively less than 8, milligrams, after 1,000 cycles of the CS-17 abrading wheel (with a load of 500 g) in accordance with ASTM D4060. Further, the coating generally has excellent UV stability as measured in accordance with ASTM 4587 even when the coating composition is free from UV stabilizers. For example, even after 250 hours of testing under ASTM 4587, there is generally no physical damage to or delamination of the coating.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The following examples are intended to illustrate the invention and are not to be viewed in any way as limiting to the scope of the invention.

EXAMPLES

Synthesis Examples

Various high molecular weight polycarbodiimides are formed in accordance with the method by which the high molecular weight polycarbodiimide of the instant coating composition is produced. Similarly, comparative high molecular weight polycarbodiimides are prepared from comparative methods to illustrate the impact of the instant method on the high molecular weight polycarbodiimide of the instant coating composition.

The following Isocyanate Components are referenced throughout the Examples as Isocyanate Components 1-4:
    Isocyanate Component 1 is toluene diisocyanate (TDI);
    Isocyanate Component 2 is methylene diphenyl diisocyanate (MDI);
    Isocyanate Component 3 is isophorone diisocyanate (IPDI); and
    Isocyanate Component 4 is naphthalene diisocyanate (NDI).

The following First Solvents are referenced throughout the Examples as First Solvents 1-5:
    First Solvent 1 is toluene;
    First Solvent 2 is tetrahydrofuran (THF);
    First Solvent 3 is xylene;
    First Solvent 4 is tetrachloroethylene; and
    First Solvent 5 is chlorobenzene.

The following Second Solvents are referenced throughout the Examples as Second Solvents 1 and 2:
    Second Solvent 1 is toluene; and
    Second Solvent 2 is tetrahydrofuran (THF).

The Carbodiimidization Catalyst referenced throughout the Examples is 3-methyl-1-phenyl-2-phospholene-1-oxide.

Synthesis Example 1

64.8 grams of Isocyanate Component 1, 0.144 grams of the Carbodiimidization Catalyst and 550 mL of the First Solvent 1 are disposed in a three neck round bottom flask equipped with a magnetic stirrer and a condenser to form a mixture. The mixture is heated to about 110° C., i.e., the boiling point temperature of the First Solvent 1, in 15-20 minutes under a static nitrogen atmosphere. The mixture is held at 110° C. under a static nitrogen atmosphere for about four hours, during which carbon dioxide ($CO_2$) is released from the mixture. The mixture is initially a clear yellow liquid, but the mixture becomes turbid after about four hours while being held at about 110° C. under a static nitrogen atmosphere. The mixture becomes more turbid with time, i.e., the mixtures becomes more turbid between the third and fourth hour during which the mixture is held at about 110° C. under a static nitrogen atmosphere. After about four hours, at least one carbodiimide compound is formed in the mixture. The at least one carbodiimide compound is a clear solid precipitate in the bottom of the flask. The flask and its contents are cooled to room temperature. 250 mL of the Second Solvent 2 and an additional 0.1 grams of the Carbodiimidization Catalyst are disposed in the flask. The at least one carbodiimide compound dissolves instantly. The flask and its contents are heated to about 94° C., i.e., the boiling point temperature of a combination of the First Solvent 1 and the Second Solvent 2, under a static nitrogen atmosphere for about two hours to form a high molecular weight polycarbodiimide. The high molecular weight polycarbodiimide is precipitated in hexane and dried in an oven for about 2 hours at about 70° C.

Synthesis Example 2

64.8 grams of Isocyanate Component 1, 0.144 grams of the Carbodiimidization Catalyst and 550 mL of the First Solvent 2 are disposed in a three neck round bottom flask equipped with a magnetic stirrer and a condenser to form a mixture. The mixture is heated to about 66° C., i.e., the boiling point temperature of the First Solvent 2, in 15-20 minutes under a static nitrogen atmosphere. The mixture is held at 66° C. under a static nitrogen atmosphere for about four hours, during which carbon dioxide ($CO_2$) is released from the mixture. The mixture is initially a clear yellow liquid, but the mixture becomes turbid after about four hours while being held at about 66° C. under a static nitrogen atmosphere. The mixture becomes more turbid with time, i.e., the mixtures becomes more turbid between the third and fourth hour during which the mixture is held at about 66° C. under a static nitrogen atmosphere. After about four hours, at least one carbodiimide compound is formed in the mixture. The flask and its contents are cooled to room temperature. 250 mL of the Second Solvent 1 is disposed in the flask. The flask and its contents are heated to about 85° C., i.e., the boiling point temperature of a combination of the First Solvent 2 and the Second Solvent 1, under a static nitrogen atmosphere for about two hours to form a polycarbodiimide The polycarbodiimide is removed from the bottom of the flask, diluted in THF, and analyzed, as described in greater detail below.

Synthesis Example 3

64.8 grams of Isocyanate Component 1, 0.144 grams of the Carbodiimidization Catalyst and 550 mL of the First Solvent 1 are disposed in a three neck round bottom flask equipped with a magnetic stirrer and a condenser to form a mixture. The mixture is heated to about 110° C., i.e., the boiling point temperature of the First Solvent 1, in 15-20 minutes under a static nitrogen atmosphere. The mixture is held at 110° C. under a static nitrogen atmosphere for about four hours, during which carbon dioxide ($CO_2$) is released from the mixture. The mixture is initially a clear yellow liquid, but the mixture becomes turbid after about four hours while being held at about 110° C. under a static nitrogen atmosphere. The mixture becomes more turbid with time, i.e., the mixtures becomes more turbid between the third and fourth hour during which the mixture is held at about 110° C. under a static nitrogen atmosphere. After about four hours, at least one carbodiimide compound is formed in the mixture. The flask and its contents are cooled to room temperature. 250 mL of the Second Solvent 1 is disposed in the flask. The flask and its contents are heated to about 110° C., i.e., the boiling point temperature the First Solvent 1 and the Second Solvent 1, under a static nitrogen atmosphere for about two hours to form a polycarbodiimide The polycarbodiimide is removed from the bottom of the flask, diluted in THF, and analyzed, as described in greater detail below.

Synthesis Example 4

64.8 grams of Isocyanate Component 1, 0.144 grams of the Carbodiimidization Catalyst and 550 mL of the First Solvent 2 are disposed in a three neck round bottom flask equipped with a magnetic stirrer and a condenser to form a mixture. The mixture is heated to about 66° C., i.e., the boiling point temperature of the First Solvent 2, in 15-20 minutes under a static nitrogen atmosphere. The mixture is held at 66° C. under a static nitrogen atmosphere for about four hours, during which carbon dioxide ($CO_2$) is released from the mixture. After about four hours, at least one carbodiimide compound is formed in the mixture. The flask and its contents are cooled to room temperature. 250 mL of the Second Solvent 2 is disposed in the flask. The flask and its contents are heated to about 66° C., i.e., the boiling point temperature the First Solvent 2 and the Second Solvent 2, under a static nitrogen atmosphere for about two hours to form a polycarbodiimide. The polycarbodiimide is removed from the bottom of the flask, diluted in THF, and analyzed, as described in greater detail below.

Synthesis Example 5

64.8 grams of Isocyanate Component 1, 0.144 grams of the Carbodiimidization Catalyst and 550 mL of the First Solvent 3 are disposed in a three neck round bottom flask equipped with a magnetic stirrer and a condenser to form a mixture. The mixture is heated to about 110° C. in 15-20 minutes under a static nitrogen atmosphere. The mixture is held at 110° C. under a static nitrogen atmosphere for about four hours, during which carbon dioxide ($CO_2$) is released from the mixture. After about five hours, at least one carbodiimide compound is formed in the mixture. The flask and its contents are cooled to room temperature. 250 mL of the Second Solvent 2 is disposed in the flask. The flask and its contents are heated to about 110° C. under a static nitrogen atmosphere for about two hours to form a polycarbodiimide. The polycarbodiimide is removed from the bottom of the flask, diluted in THF, and analyzed, as described in greater detail below.

Synthesis Example 6

64.8 grams of Isocyanate Component 1, 0.144 grams of the Carbodiimidization Catalyst and 800 mL of the First Solvent 3 are disposed in a three neck round bottom flask equipped with a magnetic stirrer and a condenser to form a mixture. The mixture is heated to about 110° C. in 15-20 minutes under a static nitrogen atmosphere. The mixture is held at 110° C. under a static nitrogen atmosphere. However, after about one hour, at least one carbodiimide compound is formed in the mixture, which precipitated in the mixture. 250 mL of the Second Solvent 2 and an additional 0.1 grams of the Carbodiimidization Catalyst are disposed in the flask. The at least one carbodiimide compound dissolves instantly. The flask and its contents are heated to about 85° C., i.e., the boiling point temperature of a combination of the First Solvent 3 and the Second Solvent 2, under a static nitrogen atmosphere for about two hours to form a high molecular weight polycarbodiimide. The high molecular weight polycarbodiimide is precipitated in hexane and dried in an oven for about 2 hours at about 70° C.

Comparative Synthesis Example 1

64.8 grams of Isocyanate Component 1, 0.144 grams of the Carbodiimidization Catalyst and 800 mL of the First Solvent 1 are disposed in a three neck round bottom flask equipped with a magnetic stirrer and a condenser to form a mixture. The mixture is heated to about 110° C., i.e., the boiling point temperature of the First Solvent 1, in 15-20 minutes under a static nitrogen atmosphere. The mixture is held at 110° C. under a static nitrogen atmosphere for about six hours, during which carbon dioxide ($CO_2$) is released from the mixture. The mixture is initially a clear yellow liquid, but the mixture becomes turbid after about four hours while being held at about 110° C. under a static nitrogen atmosphere. The mixture becomes more turbid with time, i.e., the mixtures becomes more turbid between the fifth and sixth hour during which the mixture is held at about 110° C. under a static nitrogen atmosphere. After about six hours, at least one carbodiimide compound is formed in the mixture. The at least one carbodiimide compound is a clear solid precipitate in the bottom of the flask. The at least one carbodiimide compound is removed from the bottom of the flask, diluted in THF, and analyzed, as described in greater detail below.

Comparative Synthesis Example 2

64.8 grams of Isocyanate Component 1, 0.144 grams of the Carbodiimidization Catalyst and 550 mL of the First Solvent 2 are disposed in a three neck round bottom flask equipped with a magnetic stirrer and a condenser to form a mixture. The mixture is heated to about 66° C., i.e., the boiling point temperature of the First Solvent 2, in 15-20 minutes under a static nitrogen atmosphere. The mixture is held at 66° C. under a static nitrogen atmosphere for about six hours, during which carbon dioxide ($CO_2$) is released from the mixture. The mixture is initially a clear yellow liquid, but the mixture becomes turbid after about four hours while being held at about 66° C. under a static nitrogen atmosphere. The mixture becomes more turbid with time, i.e., the mixtures becomes more turbid between the fifth and sixth hour during which the mixture is held at about 66° C. under a static nitrogen atmosphere. After about six hours, at least one carbodiimide compound is formed in the mixture. The at least one carbodiimide compound is a clear solid precipitate in the bottom of the flask. The at least one carbodiimide compound is removed from the bottom of the flask, diluted in THF, and analyzed, as described in greater detail below.

Comparative Synthesis Example 3

64.8 grams of Isocyanate Component 1, 0.144 grams of the Carbodiimidization Catalyst, 550 mL of the First Solvent 1 and 250 mL of the Second Solvent 2 are disposed in a three neck round bottom flask equipped with a magnetic stirrer and a condenser to form a mixture. The mixture is heated to about 85° C., i.e., the boiling point temperature of a combination of the First Solvent 1 and the Second Solvent 2, in 15-20 minutes under a static nitrogen atmosphere. The mixture is held at 85° C. under a static nitrogen atmosphere for about six hours, during which carbon dioxide ($CO_2$) is released from the mixture. The mixture is initially a clear yellow liquid, but the mixture becomes turbid after about four hours while being held at about 85° C. under a static nitrogen atmosphere. The mixture becomes more turbid with time, i.e., the mixtures becomes more turbid between the fifth and six hour during which the mixture is held at about 85° C. under a static nitrogen atmosphere. After about six hours, at least one carbodiimide compound is formed in the mixture. The at least one carbodiimide compound is removed from the bottom of the flask, diluted in THF, and analyzed, as described in greater detail below.

Comparative Synthesis Example 4

93.09 grams of Isocyanate Component 2, 0.144 grams of the Carbodiimidization Catalyst and 800 mL of the First Solvent 1 are disposed in a three neck round bottom flask equipped with a magnetic stirrer and a condenser to form a mixture. The mixture is heated to about 110° C., i.e., the boiling point temperature of the First Solvent 1, in 15-20 minutes under a static nitrogen atmosphere. The mixture is held at 110° C. under a static nitrogen atmosphere. However, after about one hour, at least one carbodiimide compound is formed in the mixture, which precipitated in the mixture. 250 mL of the Second Solvent 2 is disposed in the flask. The flask and its contents are heated to about 85° C. under a static nitrogen atmosphere. However, the at least one carbodiimide compound remains precipitated in the flask despite the addition of the Second Solvent 2 and did not polymerize further.

Comparative Synthesis Example 5

10.8 grams of Isocyanate Component 1, 0.026 grams of the Carbodiimidization Catalyst and 100 mL of the First Solvent 4 are disposed in a round bottom flask to form a mixture. The mixture is heated to about 120° C. under a static nitrogen atmosphere and is held at this temperature for about four hours to produce a polycarbodiimide The polycarbodiimide is removed from the bottom of the flask, diluted in THF, and analyzed, as described in greater detail below.

Comparative Synthesis Example 6

5.4 grams of Isocyanate Component 1, 0.012 grams of the Carbodiimidization Catalyst and 50 mL of the First Solvent 5 are disposed in a round bottom flask to form a mixture. The mixture is heated to about 130° C. under a static nitrogen atmosphere and is held at this temperature for about four hours to produce a polycarbodiimide The polycarbodiimide is removed from the bottom of the flask, diluted in THF, and analyzed, as described in greater detail below.

Comparative Synthesis Example 7

82.69 grams of Isocyanate Component 3, 0.144 grams of the Carbodiimidization Catalyst and 550 mL of the First Solvent 1 are disposed in a three neck round bottom flask equipped with a magnetic stirrer and a condenser to form a mixture. The mixture is heated to about 110° C., i.e., the boiling point temperature of the First Solvent 1, in 15-20 minutes under a static nitrogen atmosphere. The mixture is held at 110° C. under a static nitrogen atmosphere for about four hours. After about four hours, 250 mL of the Second Solvent 2 is disposed in the flask. The flask and its contents are heated to about 94° C., i.e., the boiling point temperature of a combination of the First Solvent 1 and the Second Solvent 2, under a static nitrogen atmosphere for about two hours. The Isocyanate Component 3 did not polymerize and no high molecular weight polycarbodiimide was formed.

Comparative Synthesis Example 8

78.9 grams of Isocyanate Component 4, 0.144 grams of the Carbodiimidization Catalyst and 550 mL of the First Solvent 1 are disposed in a three neck round bottom flask equipped with a magnetic stirrer and a condenser to form a mixture. The mixture is heated to about 110° C., i.e., the boiling point temperature of the First Solvent 1, in 15-20 minutes under a static nitrogen atmosphere. The mixture is held at 110° C.

under a static nitrogen atmosphere. However, after about 20 minutes, at least one carbodiimide compound is formed in the mixture, which precipitated in the mixture. 250 mL of the Second Solvent 2 and an additional 0.1 grams of the Carbodiimidization Catalyst are disposed in the flask. The flask and its contents are heated to about 85° C. under a static nitrogen atmosphere. However, the at least one carbodiimide compound remained precipitated in the flask despite the addition of the Second Solvent 2 and did not polymerize further.

contents are heated to about 85° C. under a static nitrogen atmosphere. However, the at least one carbodiimide compound remained precipitated in the flask despite the addition of the Second Solvent 2 and did not polymerize further.

Table 1 below summarizes the respective components (i.e., the Isocyanate Component, the Carbodiimidization Catalyst, the First Solvent and the Second Solvent) utilized in Synthesis Examples 1-6 and Comparative Synthesis Examples 1-9.

TABLE 1

| Example | Isocyanate Component | Carbodiimidization Catalyst | First Solvent | Second Solvent |
|---|---|---|---|---|
| Synthesis Example 1 | Isocyanate Component 1 | Carbodiimidization Catalyst | First Solvent 1 | Second Solvent 2 |
| Synthesis Example 2 | Isocyanate Component 1 | Carbodiimidization Catalyst | First Solvent 2 | Second Solent 1 |
| Synthesis Example 3 | Isocyanate Component 1 | Carbodiimidization Catalyst | First Solvent 1 | Second Solvent 1 |
| Synthesis Example 4 | Isocyanate Component 1 | Carbodiimidization Catalyst | First Solvent 2 | Second Solvent 2 |
| Synthesis Example 5 | Isocyanate Component 1 | Carbodiimidization Catalyst | First Solvent 3 | Second Solvent 2 |
| Synthesis Example 6 | Isocyanate Component 1 | Carbodiimidization Catalyst | First Solvent 3 | Second Solvent 2 |
| Comparative Synthesis Example 1 | Isocyanate Component 1 | Carbodiimidization Catalyst | First Solvent 1 | None |
| Comparative Synthesis Example 2 | Isocyanate Component 1 | Carbodiimidization Catalyst | First Solvent 2 | None |
| Comparative Synthesis Example 3 | Isocyanate Component 1 | Carbodiimidization Catalyst | First Solvents 1 and 2 | None |
| Comparative Synthesis Example 4 | Isocyanate Component 2 | Carbodiimidization Catalyst | First Solvent 1 | Second Solvent 2 |
| Comparative Synthesis Example 5 | Isocyanate Component 1 | Carbodiimidization Catalyst | First Solvent 4 | None |
| Comparative Synthesis Example 6 | Isocyanate Component 1 | Carbodiimidization Catalyst | First Solvent 5 | None |
| Comparative Synthesis Example 7 | Isocyanate Component 3 | Carbodiimidization Catalyst | First Solvent 1 | Second Solvent 2 |
| Comparative Synthesis Example 8 | Isocyanate Component 4 | Carbodiimidization Catalyst | First Solvent 1 | Second Solvent 2 |
| Comparative Synthesis Example 9 | Isocyanate Components 1 and 4 | Carbodiimidization Catalyst | First Solvent 1 | Second Solvent 2 | pound remained precipitated in the flask despite the addition of the Second Solvent 2 and did not polymerize further.

Comparative Synthesis Example 9

64.8 grams of a combination of Isocyanate Component 1 and Isocyanate Component 4, 0.144 grams of the Carbodiimidization Catalyst and 550 mL of the First Solvent 1 are disposed in a three neck round bottom flask equipped with a magnetic stirrer and a condenser to form a mixture. Isocyanate Component 1 and Isocyanate Component 4 are utilized in a 50/50 molar ratio, i.e., 32.4 grams of Isocyanate Component 1 and 39.09 grams of Isocyanate Component 4 are utilized. The mixture is heated to about 110° C., i.e., the boiling point temperature of the First Solvent 1, in 15-20 minutes under a static nitrogen atmosphere. The mixture is held at 110° C. under a static nitrogen atmosphere. However, after about 20 minutes, at least one carbodiimide compound is formed in the mixture, which precipitated in the mixture. 250 mL of the Second Solvent 2 is disposed in the flask. The flask and its Table 2 below illustrates the respective results obtained from Synthesis Examples 1-6 and Comparative Synthesis Examples 1-9 above. Specifically, Table 2 below sets forth the number average molecular weight (Mn), the weight average molecular weight (Mw) and the polydispersity for the respective products formed in Synthesis Examples 1-6 and Comparative Synthesis Examples 1-9 above, as measured via a refractive index detector and HR columns.

TABLE 2

| Example | Mn | Mw | Polydispersity |
|---|---|---|---|
| Synthesis Example 1 | | Not Measurable | |
| Synthesis Example 2 | 1,269 | 2,413 | 1.33 |
| Synthesis Example 3 | 3,339 | 78,444 | 23.49 |
| Synthesis Example 4 | 1,224 | 2,798 | 2.29 |
| Synthesis Example 5 | 2,814 | 210,614 | 74.80 |
| Synthesis Example 6 | | Not Measurable | |
| Comparative Synthesis Example 1 | 3,001 | 66,122 | 22.00 |

TABLE 2-continued

| Example | Mn | Mw | Polydispersity |
|---|---|---|---|
| Comparative Synthesis Example 2 | 1,102 | 1,314 | 1.19 |
| Comparative Synthesis Example 3 | 1,473 | 4,559 | 1.43 |
| Comparative Synthesis Example 4 | | Precipitated | |
| Comparative Synthesis Example 5 | 3,107 | 267,699 | 86.10 |
| Comparative Synthesis Example 6 | 2,614 | 57,784 | 22.00 |
| Comparative Synthesis Example 7 | | No Polymerization | |
| Comparative Synthesis Example 8 | | Precipitated | |
| Comparative Synthesis Example 9 | | Precipitated | |

Table 3 below illustrates the respective results obtained from Synthesis Examples 1-6 and Comparative Synthesis Examples 1-9 above. Specifically, Table 3 below sets forth the number average molecular weight (Mn), the weight average molecular weight (Mw) and the polydispersity for the respective products formed in Synthesis Examples 1-6 and Comparative Synthesis Examples 1-9 above, as measured via an evaporative light scattering detector. Additionally, Table 3 below sets forth the mole fraction percentage of the respective products formed in Synthesis Examples 1-6 and Comparative Synthesis Examples 1-9 above, as measured via an evaporative light scattering detector, having a weight average molecular weight (Mw) over 100,000, over 250,000, over 500,000 and over 1,000,000.

TABLE 3

| Example | Mn | Mw | Polydispersity | % fraction >1,000,000 | % fraction >500,000 | % fraction >250,000 | % fraction >100,000 |
|---|---|---|---|---|---|---|---|
| Synthesis Example 1 | 6,700 | 216,000 | 19.4 | 4.646 | 13.976 | 23.218 | 44.737 |
| Synthesis Example 2 | 1,240 | 2,210 | 1.8 | 0 | 0 | 0 | 0 |
| Synthesis Example 3 | 2,460 | 31,200 | 12.7 | 0 | 0.02 | 0.33 | 4.94 |
| Synthesis Example 4 | 1,300 | 2,270 | 1.7 | 0 | 0 | 0 | 0 |
| Synthesis Example 5 | 2,680 | 9,170 | 3.4 | 0 | 0 | 0 | 0 |
| Synthesis Example 6 | 2870 | 16900 | 5.9 | 0 | 0 | 0 | 0.08 |
| Comparative Synthesis Example 1 | 2,190 | 11,280 | 5.2 | 0 | 0 | 0 | 0 |
| Comparative Synthesis Example 2 | 1,210 | 2,160 | 1.8 | 0 | 0 | 0 | 0 |
| Comparative Synthesis Example 3 | 1,440 | 2,820 | 2 | 0 | 0 | 0 | 0 |
| Comparative Synthesis Example 4 | | Precipitated | | | | | |
| Comparative Synthesis Example 5 | 2,340 | 12,600 | 5.4 | 0 | 0 | 0 | 0 |
| Comparative Synthesis Example 6 | 2,600 | 12,500 | 4.8 | 0 | 0 | 0 | 0 |
| Comparative Synthesis Example 7 | | No Polymerization | | | | | |
| Comparative Synthesis Example 8 | | Precipitated | | | | | |
| Comparative Synthesis Example 9 | | Precipitated | | | | | |

Notably, the Synthesis Examples and Comparative Synthesis Examples above are included merely for purposes of illustrating the impact of the method of producing the high molecular weight polycarbodiimide on the resulting high molecular weight polycarbodiimide, at least relative to its respective molecular weight. To this end, various high molecular weight polycarbodiimides are prepared and included in coating compositions below to form coatings on substrates.

Preparation Example 1

259.2 grams of Isocyanate Component 1, 0.144 grams of the Carbodiimidization Catalyst and 2,200 mL of the First Solvent 1 are disposed in a 5 L round bottom flask equipped with a magnetic stirrer and a condenser to form a mixture. The mixture is heated to about 110° C., i.e., the boiling point temperature of the First Solvent 1, in 15-20 minutes under a static nitrogen atmosphere. The mixture is held at 110° C. under a static nitrogen atmosphere for about four hours, during which carbon dioxide ($CO_2$) is released from the mixture. The mixture is initially a clear yellow liquid, but the mixture becomes turbid after about four hours while being held at about 110° C. under a static nitrogen atmosphere. The mixture becomes more turbid with time, i.e., the mixtures becomes more turbid between the third and fourth hour during which the mixture is held at about 110° C. under a static nitrogen atmosphere. After about four hours, at least one carbodiimide compound is formed in the mixture. The at least one carbodiimide compound is a clear solid precipitate in the bottom of the flask. 1,000 mL of the Second Solvent 2 and an additional 0.1 grams of the Carbodiimidization Catalyst are disposed in the flask over a 15 minute period. The at least one carbodiimide compound dissolves instantly. The temperature of the flask and its contents is lowered to about 88° C., i.e., about the boiling point temperature of a combination of the First Solvent 1 and the Second Solvent 2, under a static nitrogen atmosphere for about two hours to form a high molecular weight polycarbodiimide Mn, Mw, and polydispersity of the high molecular weight polycarbodiimide are measured via a refractive index detector and HR columns In particular, Mn, Mw, and polydispersity are measured after 24 hours (although the reaction is not progressed beyond 6 hours), and after precipitating the high molecular weight polycarbodiimide in hexane and re-dissolving the high molecular weight polycarbodiimide in the second solvent. The average results are set forth below in Table 4:

TABLE 4

| Example | Time | Mn | Mw | Polydispersity |
|---|---|---|---|---|
| Preparation Example 1 | 24 hours | 2,420 | 53,300 | 22.0 |
| Preparation Example 1 | re-dissolving* | 11,400 | 68,800 | 6.0 |

*after precipitating the high molecular weight polycarbodiimide in hexane and re-dissolving the high molecular weight polycarbodiimide in the second solvent.

Practical Examples 1-8

Coating compositions comprising the high molecular weight polycarbodiimide of Preparation Example 1 are prepared (corresponding to Practical Examples 1-8). The coating composition comprises the high molecular weight polycarbodiimide and the first and second solvents such that the high molecular weight polycarbodiimide is solubilized. The coating composition is sprayed to form coatings on different substrates. Table 5 below sets forth the substrates on which the various coating compositions are applied along with the heat treatment of the respective coating and the thickness of the respective coating:

TABLE 5

| Practical Example | Substrate | Heat Treatment Time (min) | Temperature (° C.) | Thickness (Mil) |
|---|---|---|---|---|
| Practical Example 1 | 1 | 15 | 150 | 1.1 |
| Practical Example 2 | 1 | 15 | 150 | 1.23 |
| Practical Example 3 | 1 | 10 | 220 | 1.8 |
| Practical Example 4 | 2 | 15 | 150 | 1.22 |
| Practical Example 5 | 2 | 15 | 150 | 1.5 |
| Practical Example 6 | 2 | 10 | 220 | 1.93 |
| Practical Example 7 | 3 | 15 | 150 | 1.32 |
| Practical Example 8 | 3 | 10 | 220 | 1.45 |

The substrates all have thickness of 26 microns and are cold roll steel test panels from ACT Test Panel Technologies of Hillsdale, Mich. In particular:

Substrate 1 is B1000, which is a bare iron phosphate coated steel panel (no parcolene) that is unpolished;

Substrate 2 is an unpolished steel panel; and

Substrate 3 is a polished steel panel.

The coatings of Practical Examples 1-8 are subjected to an impact resistance test and an adhesion test. Specifically, the impact resistance test is conducted in accordance with ASTM D2794, where the impact force ranges from 10 (minimum) to 160 (maximum) pounds. The adhesion test is conducted in accordance with ASTM D3002, which utilizes a cross-cut tester from BYK-Gardner USA of Columbia, Md.

The greater the impact force (either direct or indirect) that may be sustained by the coating, the greater the impact resistance of the coating. A direct impact force is an impact force as applied to the coating, whereas an indirect impact force is an impact force applied to the substrate opposite the coating. Table 6 below sets forth the maximum direct and indirect impact forces to which the coatings may be subjected while maintaining excellent physical properties and adherence to the substrates (from 10 to 160 pounds) as measured in accordance with ASTM D2794. Similarly, Table 6 below sets forth the results from scoring the coatings in accordance with ASTM D3002 with the cross-cut tester. Under ASTM D3002, results range from 1B, which is least desirable and which indicates that the coating has flaked along the edges of cuts in large ribbons and/or some squares have detached from the substrate partly or wholly, to 5B, which is most desirable and which indicates that the edges of cuts are completely smooth with none of the squares of the lattice detaching from the substrate. Accordingly, coatings achieving a rating of 5B under ASTM D3002 have the greatest adhesion, while coatings having a rating of 1B under ASTM D3002 have minimal adhesion.

TABLE 6

| Practical Example | Direct Impact (lbs) | In-direct Impact (lbs) | Adhesion |
|---|---|---|---|
| Practical Example 1 | 160 | 160 | 5B |
| Practical Example 2 | 160 | 160 | 5B |
| Practical Example 3 | 160 | 160 | 5B |
| Practical Example 4 | 160 | 160 | 5B |
| Practical Example 5 | 160 | 160 | 5B |
| Practical Example 6 | 160 | 160 | 5B |
| Practical Example 7 | 160 | 160 | 5B |
| Practical Example 8 | 160 | 160 | 5B |

As clearly illustrated above in Table 6, the coatings of Practical Examples 1-8 had excellent impact resistance and adhesion.

Chemical resistance of a coating formed from a coating composition comprising the high molecular weight polycarbodiimide of Preparation Example 1 is tested. In particular, a coating is spray coated and cured on a cold roll steel test panel as described above. Various chemicals, stains, or solutions are applied on different portions of the coating to determine the effects thereof at different time increments via optical inspection. The results are set forth below in Table 7.

TABLE 7

| | Chemical or Stain | | | | | | | | |
|---|---|---|---|---|---|---|---|---|---|
| Time | Bleach | Gasoline | Brake Fluid (3D) | MEK | IPA/H2O | HCl (6N) | Acetic Acid | NaOH (50 wt %) | Sharpie |
| 1 hour | 4 | 4 | 4 | 4 | 4 | 4 | 4 | 4 | 4 |
| 24 hours | 4 | 4 | 4 | 4 | 4 | 4 | 4 | 4 | 4 |
| 1 week | 3.5 | 4 | 4 | 4 | 4 | 3 | 3.5 | 4 | 4 |

In Table 7 above, each stain is optically inspected on the coating at the time increment identified in column 1 according to the following scale:

0 indicates that the coating was destroyed;
1 indicates heavy staining, blushing, or softening;
2 indicates moderate staining, blushing, or softening;
3 indicates light staining, blushing, or softening; and
4 indicates no effect.

To further illustrate the excellent chemical resistance of the coating formed via the instant method and from the instant coating composition, a comparative coating is formed from an epoxy-polyamide composition. Such epoxy-polyamide coatings are generally understood in the art to have desirable chemical resistance. The same chemicals or stains are utilized on the comparative coating as on the coating of Table 7. The results are set forth below in Table 8:

TABLE 8

| | Chemical or Stain | | | | | | | | |
|---|---|---|---|---|---|---|---|---|---|
| Time | Bleach | Gasoline | Brake Fluid (3D) | MEK | IPA/H2O | HCl (6N) | Acetic Acid | NaOH (50 wt %) | Sharpie |
| 1 hour | 3 | 3 | 3 | n/a | 4 | 3 | 0 | 4 | 4 |
| 24 hours | 3 | 3 | 3 | n/a | 4 | 1 | 0 | 4 | 4 |
| 1 week | 2 | 3 | 3 | n/a | 3 | 1 | 0 | 4 | 2 |

As clearly illustrated above in Table 8 in view of Table 7, the instant coating had identical or better chemical or stain resistance than the comparative coating relative to every chemical or stain utilized. In fact, the instant coating had better chemical resistance than the comparative coating relative to every chemical or stain other than NaOH, to which the instant coating and the comparative coating had identical resistances.

Preparation Example 2

259.2 grams of Isocyanate Component 1, 0.144 grams of the Carbodiimidization Catalyst and 2,200 mL of the First Solvent 1 are disposed in a 5 L round bottom flask equipped with a magnetic stirrer and a condenser to form a mixture. The mixture is heated to about 110° C., i.e., the boiling point temperature of the First Solvent 1, in 15-20 minutes under a static nitrogen atmosphere. The mixture is held at 110° C. under a static nitrogen atmosphere for about four hours, during which carbon dioxide ($CO_2$) is released from the mixture. The mixture is initially a clear yellow liquid, but the mixture becomes turbid after about four hours while being held at about 110° C. under a static nitrogen atmosphere. The mixture becomes more turbid with time, i.e., the mixtures becomes more turbid between the third and fourth hour during which the mixture is held at about 110° C. under a static nitrogen atmosphere. After about four hours, at least one carbodiimide compound is formed in the mixture. The at least one carbodiimide compound is a clear solid precipitate in the bottom of the flask. 1,000 mL of the Second Solvent 2 and an additional 0.1 grams of the Carbodiimidization Catalyst are disposed in the flask over a 15 minute period. The at least one carbodiimide compound dissolves instantly. The temperature of the flask and its contents is lowered to about 88° C., i.e., about the boiling point temperature of a combination of the First Solvent 1 and the Second Solvent 2, under a static nitrogen atmosphere for about two hours to form a high molecular weight polycarbodiimide Mn, Mw, and polydispersity of the high molecular weight polycarbodiimide are measured via a refractive index detector and HR columns In particular, Mn, Mw, and polydispersity are measured after 24 hours (although the reaction is not progressed beyond 6 hours), and after precipitating the high molecular weight polycarbodiimide in hexane and re-dissolving the high molecular weight polycarbodiimide in the second solvent. The average results are set forth below in Table 9:

TABLE 9

| Example | Time | Mn | Mw | Polydispersity |
|---|---|---|---|---|
| Preparation Example 1 | 24 hours | 1,800 | 178,000 | 94.85 |
| Preparation Example 1 | re-dissolving* | 28,050 | 284,000 | 10.1 |

*after precipitating the high molecular weight polycarbodiimide in hexane and re-dissolving the high molecular weight polycarbodiimide in the second solvent.

A coating is formed from a coating composition comprising the high molecular weight polycarbodiimide of Preparation Example 2. Specifically, the coating composition is spray coated onto a cold roll steel test panel and cured for 15 minutes at 150° C. to form a coating having a thickness of 2.45 mils The coating is then subjected to an abrasion test in accordance with ASTM D4050. In particular, the coating is subjected to a Taber Abrasion Test, which utilizes an H-18 wheel type and S-42 sandpaper as an abrading material under a 500 g load. The coating is weighed after every 100 cycles, and the sandpaper is replaced every 200 cycles. The results are set forth below in Table 10:

TABLE 10

| Cycles | Coating Mass | | | |
| --- | --- | --- | --- | --- |
| | Initial (g) | Final (g) | Loss (g) | Loss (mg) |
| 100 | 69.674 | 69.662 | 0.012 | 12 |
| 200 | 69.674 | 69.652 | 0.022 | 22 |
| 300 | 69.674 | 69.638 | 0.036 | 36 |
| 400 | 69.674 | 69.631 | 0.043 | 43 |
| 500 | 69.674 | 69.623 | 0.051 | 51 |
| 600 | 69.674 | 69.610 | 0.064 | 64 |
| 700 | 69.674 | 69.600 | 0.074 | 74 |
| 800 | 69.674 | 69.585 | 0.089 | 89 |
| 900 | 69.674 | 69.570 | 0.104 | 104 |
| 1000 | 69.674 | 69.557 | 0.117 | 117 |

A second coating is formed in an identical manner to that which is described above with reference to Table 10. The coating is subjected to a chemical resistance test in accordance with ASTM D4752 with a methyl ethyl ketone (MEK) double rub. No physical damage to the coating was observed when subjecting the coating to the chemical resistance test in accordance with ASTM D4752.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

What is claimed is:

1. A method of forming a coating on a substrate, said method comprising the steps of:
    providing an isocyanate component comprising toluene diisocyanate (TDI);
    providing a carbodiimidization catalyst;
    providing a first solvent having a boiling point temperature of from about 50 to about 150° C.;
    polymerizing the isocyanate component for a first period of time in the first solvent and in the presence of the carbodiimidization catalyst to produce a reaction mixture including at least one carbodiimide compound and the first solvent;
    combining a second solvent, which is the same as or different from the first solvent, and the reaction mixture;
    polymerizing the at least one carbodiimide compound for a second period of time in the first and second solvents and in the presence of the carbodiimidization catalyst to produce a high molecular weight polycarbodiimide having a weight average molecular weight of at least about 100,000; and
    applying a coating composition comprising the high molecular weight polycarbodiimide on the substrate to form the coating.

2. A method as set forth in claim 1 wherein the step of applying the coating composition comprises spraying or casting the coating composition on the substrate.

3. A method as set forth in claim 1 wherein the coating composition consists essentially of the high molecular weight polycarbodiimide, the first solvent, and the second solvent.

4. A method as set forth in claim 1 wherein the coating composition comprises the high molecular weight polycarbodiimide in an amount of from greater than 0 to less than 35 percent by weight based on the total weight of the coating composition.

5. A method as set forth in claim 1 wherein the high molecular weight polycarbodiimide has a mole fraction greater than 0 having a molecular weight of at least about 500,000.

6. A method as set forth in claim 1 wherein the first solvent comprises toluene and the second solvent comprises tetrahydrofuran (THF).

* * * * *